(12) United States Patent
Amin et al.

(10) Patent No.: US 6,261,998 B1
(45) Date of Patent: Jul. 17, 2001

(54) REFINED OIL GELLING SYSTEM

(75) Inventors: Junad Amin; Travis Lee Allan; Jessica Norgaard, all of Calgary (CA)

(73) Assignee: Fracmaster Ltd. (CA)

( * ) Notice: Subject to any disclaimer, the term of this patent is extended or adjusted under 35 U.S.C. 154(b) by 0 days.

(21) Appl. No.: 09/255,769

(22) Filed: Feb. 23, 1999

(30) Foreign Application Priority Data

May 12, 1998 (CA) .................................................. 2237383

(51) Int. Cl.[7] ................................ C09K 7/00; C09K 7/06
(52) U.S. Cl. ......................... 507/238; 507/922; 166/265
(58) Field of Search ..................................... 507/238, 922; 166/265

(56) References Cited

U.S. PATENT DOCUMENTS

| | | | |
|---|---|---|---|
| 3,494,949 | * | 2/1970 | Monroe et al. ........................ 556/174 |
| 3,505,374 | * | 4/1970 | Monroe .................................. 556/26 |
| 3,724,544 | * | 4/1973 | Tate ....................................... 166/271 |
| 3,757,864 | * | 9/1973 | Crawford et al. ..................... 166/308 |
| 4,038,207 | * | 7/1977 | Poklacki et al. ...................... 516/104 |
| 4,046,524 | * | 9/1977 | Van Hesden ............................ 51/306 |
| 4,153,649 | * | 5/1979 | Griffin, Jr. ............................. 558/110 |
| 4,787,994 | | 11/1988 | Thorne et al. . |
| 5,034,139 | * | 7/1991 | Reid et al. ............................. 507/229 |
| 5,086,841 | * | 2/1992 | Reid et al. ............................. 166/295 |
| 5,514,645 | * | 5/1996 | McCabe et al. ....................... 507/238 |
| 5,614,010 | * | 3/1997 | Smith et al. ........................... 166/285 |
| 5,693,837 | * | 12/1997 | Smith et al. ........................... 556/148 |
| 5,846,915 | * | 12/1998 | Smith et al. ........................... 507/269 |

FOREIGN PATENT DOCUMENTS 2216325   9/1997  (CA) .

* cited by examiner

Primary Examiner—Jill Warden
Assistant Examiner—LaToya Cross
(74) Attorney, Agent, or Firm—Lerner, David, Littenberg, Krumholz & Mentlik, LLP

(57) ABSTRACT

A fracturing fluid is provided for use in fracturing subterranean formations. It comprises a hydrocarbon base. In the base, acidified alkyl phosphate esters are complexed with metallic cations, to form a gel.

8 Claims, 4 Drawing Sheets

REFINED OIL GELLING SYSTEM

FIELD OF THE INVENTION

The present invention relates to methods and compositions for fracturing subterranean formations. In particular, the present invention provides a novel fracturing fluid for fracturing such formations.

BACKGROUND OF THE INVENTION

In order to increase the productivity of oil and gas wells, or to bring back into production wells that have essentially gone dry, it is common practice to conduct a procedure known as fracturing the well. In such a procedure, fluids known as fracturing fluids, are injected into the well at very high hydrostatic pressures. The fluids are typically viscous gels, and act under pressure to open pores and cracks in the formation, thereby to increase the overall permeability of the well. Typically, the fluids also are used to transport proppants, such as sand or ground walnut shells into the cracks and pores, thereby to ensure that the pores and cracks formed during fracturing remain open under the lower pressures that will exist after fracturing, when the well is producing.

The fluid that has been used to fracture the formation is removed by the introduction of viscosity lowering agents into same, which permit the fluid to be more easily pumped from the formation. These agents are known as breakers because they tend to break down the fracturing gel. Breakers can act on a gel in a number of ways, such as by the random oxidation of polymers to shorten the chain length thereof. In the present invention, a breaker is utilized to adjust the pH of a gel, to break same by hydrolysis. The pH of the resulting formulation in accordance with the present invention can generally range from between about 1.0 to about 2.0. However, most preferably, the pH will range from 1.4 and below.

The fracturing fluid of the present invention is a phosphate alkyl ester gel. It is known that a gel can be produced by mixing trivalent cations, such as aluminum, with a phosphate alkyl ester. However, gels obtained with known phosphate alkyl esters have not been commercially acceptable, because the viscosity developed with same has been insufficient or slow to develop.

Phosphate alkyl esters may be mono-esters, di-esters or tri-esters. In the mono-ester, one primary mono-hydric alcohol, of $C_5$–$C_{16}$ length is ester linked to a phosphate. A di-ester has two such alkyl alcohols linked to a phosphate. A tri-ester has three alkyl alcohols linked to it. As disclosed in Canadian Patent Application No. 2,216,325, commonly owned by the present applicant, commercially valuable gels are feasible with a di-ester content above 50%, preferably above 65%, and a tri-ester content below 5%. The remainder may be mono-ester.

In the aforementioned copending Canadian Application No. 2,216,325, gel development is enhanced in two important ways. First, the phosphate alkyl esters are neutralized with primary amines. Secondly, the applicants utilize a surfactant to enhance gel development. An appropriate surfactant is ammonium alkyl ($C_6$–$C_{20}$) sulfate.

In the present invention, similar or increased gel development is accomplished by reacting the phosphate alkyl esters with a mineral acid, preferably sulfuric acid, before mixing the ester with the hydrocarbon being gelled. This step accomplishes two important purposes. First, the acid treatment tends to increase the dialkyl percentage of the ester, and secondly, the sulfuric acid reacts with the alkyl phosphate esters to form alkyl sulfates, which act as a surfactants, to assist in the subsequent cross link reaction.

The prior art, in particular U.S. Pat. No. 4,787,994 shows the use of sulfuric acid (or alternatively a low molecular weight sulphonic acid such as xylene sulphonic acid) with mono- or di-ester alkyl phosphates, to preferentially attract the alkali metal ions of the activator (such as sodium aluminate). This is disclosed as being effective to increase the available cross-linking sites in the alkyl phosphate ester, and thereby permit increased cross-linking by the aluminate ions. The prior art does not, however, disclose the use of sulfuric acid to increase the di-ester content of a solution containing mono-, di-, and tri-ester alkyl phosphates. Nor does the art show the formation of alkyl sulfates in situ. The present invention, moreover, does not utilize an alkali aluminate activator, but rather an iron citrate one, which is a departure from the prior art, in that the pH of the solution with an aluminate activator is in the 3.5–4.0 range, as opposed to the 1.0–2.0 range of the present invention.

Accordingly, it will be understood that the present invention represents a significant advance over the system described and claimed in Applicant's Canadian Patent Application No. 2,216,325, while sharing some part of the technology described herein. The present invention, moreover, is an advance over the technology of U.S. Pat. No. 4,787,994, in that it does not require the use of an alkali aluminate activator.

In order to break the gel of the present invention the preferred breaker is a pH adjusting breaker, such as calcium oxide or sodium carbonate. It is preferred that the breaker be encapsulated in a porous inert substance, such as nylon.

In a broad aspect, then, the present invention relates to a fracturing fluid for use in fracturing subterranean formations comprising: a hydrocarbon base; and acidified alkyl phosphate esters complexed with metallic cations, to form a gel, in said hydrocarbon base.

BRIEF DESCRIPTION OF THE DRAWINGS

In drawings that illustrate the present invention by way of example.

DETAILED DESCRIPTION

Figure 1:
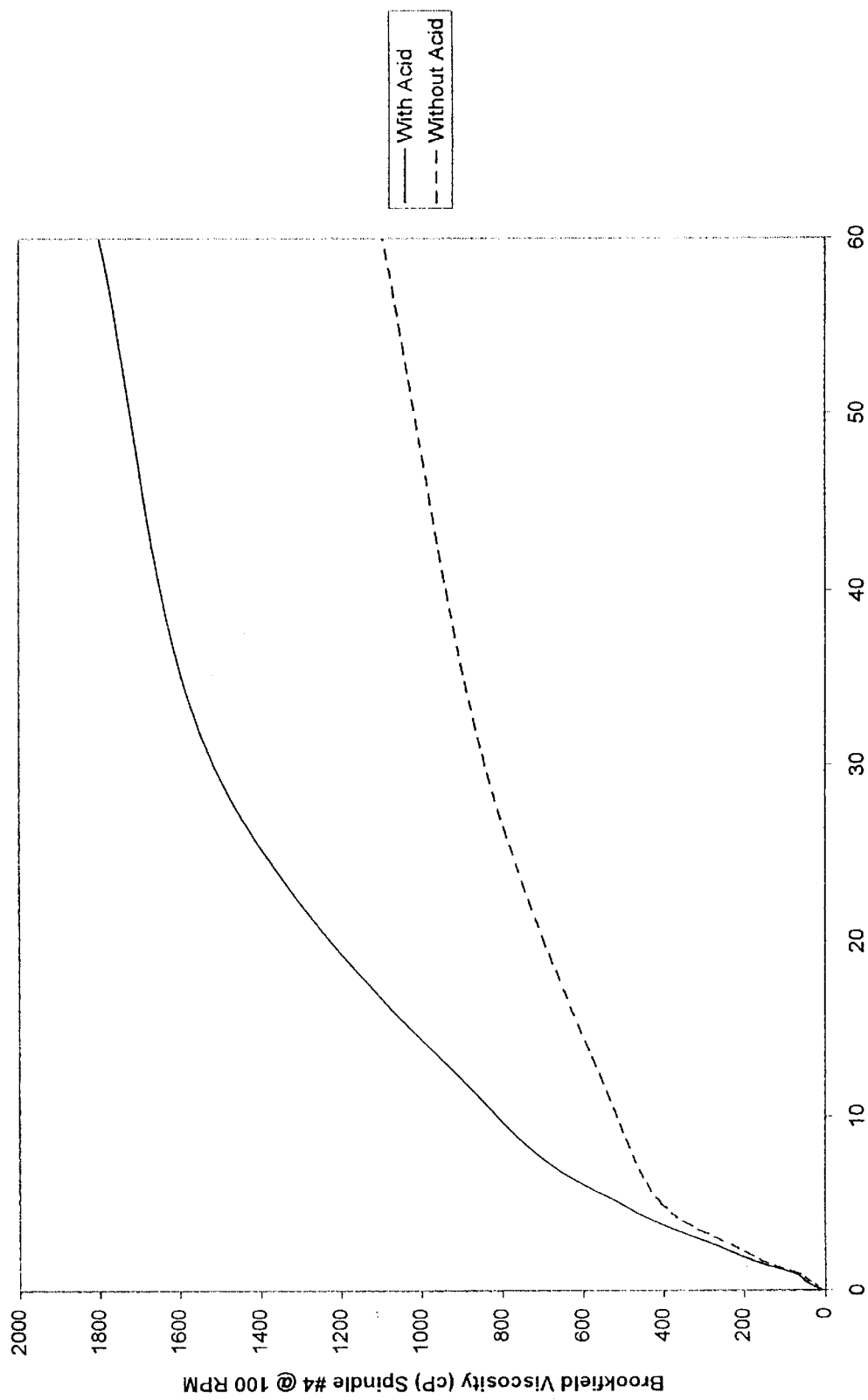
FIG. 1 is a graph illustrating the relative Brookfield viscosities of a phosphate ester composition prepared according to the present invention, and a conventional phosphate ester composition.

The phosphate ester gels of the present invention are made from primary mono-hydric alcohols of $C_5$–$C_{16}$ chain length. It is preferred to utilize alcohols of chain length $C_8$–$C_{12}$, but it will be understood that since the gels of the present invention are intended to act on hydrocarbon fluids, such as diesel fuel, kerosene, or other common hydrocarbon fluids, the selection of an optimal chain length alcohol will be a matter of choice for one skilled in the art. The alkyl alcohols are combined with phosphates, by known techniques to produce mono- di and tri-alkyl esters which may generally be represented as follows:

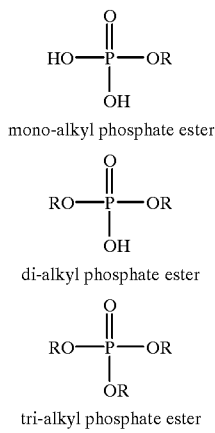

mono-alkyl phosphate ester di-alkyl phosphate ester tri-alkyl phosphate ester

The relative proportions of mono-alkyl, di-alkyl and tri-alkyl esters are important. The applicant has discovered that the di-alkyl phosphate ester content must be at least 50% for any gel development to occur, and must be at least 65% for commercially feasible gel to form. Moreover, tri-alkyl phosphate ester content must be lower than 5%, or poor gel rheological characteristics will result. There must be at least a small percentage of mono-alkyl phosphate ester present to initiate gelling.

In order to increase the di-alkyl content of the ester, commercially available alkyl phosphate preparation is acidified with sulfuric acid. This increases the di-alkyl content of the alkyl phosphate ester, and also results in the formation of sulfates, which are then available as surfactants.

Moreover, acidifying the phosphate ester mixture will lower the pH thereof, which will also enhance gel viscosity. It will be understood that, in view of the teaching of the present invention (in particular having regard to FIG. 2), a person skilled in the art will find the selection of the appropriate quantity of acid, of a desired strength, to be an obvious matter of choice involving no undue experimentation or the like. In this regard, it must be understood that the design criteria for any particular fracturing job will vary and it is not sufficient merely to always obtain the maximum, or any given, viscosity. Moreover, since the chemical environment in a formation will be unique, the fracturing fluid for it must be adjusted according, using the application of well accepted principles of engineering, and the present invention.

The partially acidified phosphate ester is then mixed in the hydrocarbon fluid to be gelled, with a trivalent cation, preferably iron ferric, supplied as ferric citrate, pH about 2.5.

The phosphate-alkyl esters and cations form a mesh-like network in the hydrocarbon fluid, resulting in a gel. The hypothesized reaction is as follows:

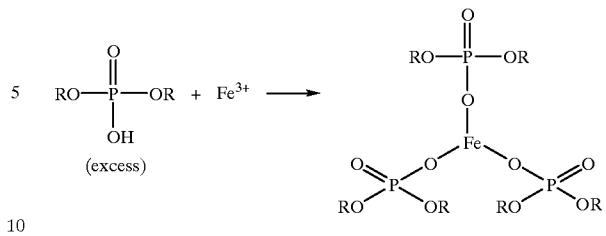

It will be understood that such a network will transform the essentially two dimensional phosphate-alkyl ester to a three dimensional, very viscous gel.

The gelling rate is moreover greatly enhanced in the presence of a surfactant. The sulphate groups formed in the present invention provide the necessary alteration of surface chemistry to result in enhancement of reaction rates.

Figure 2:
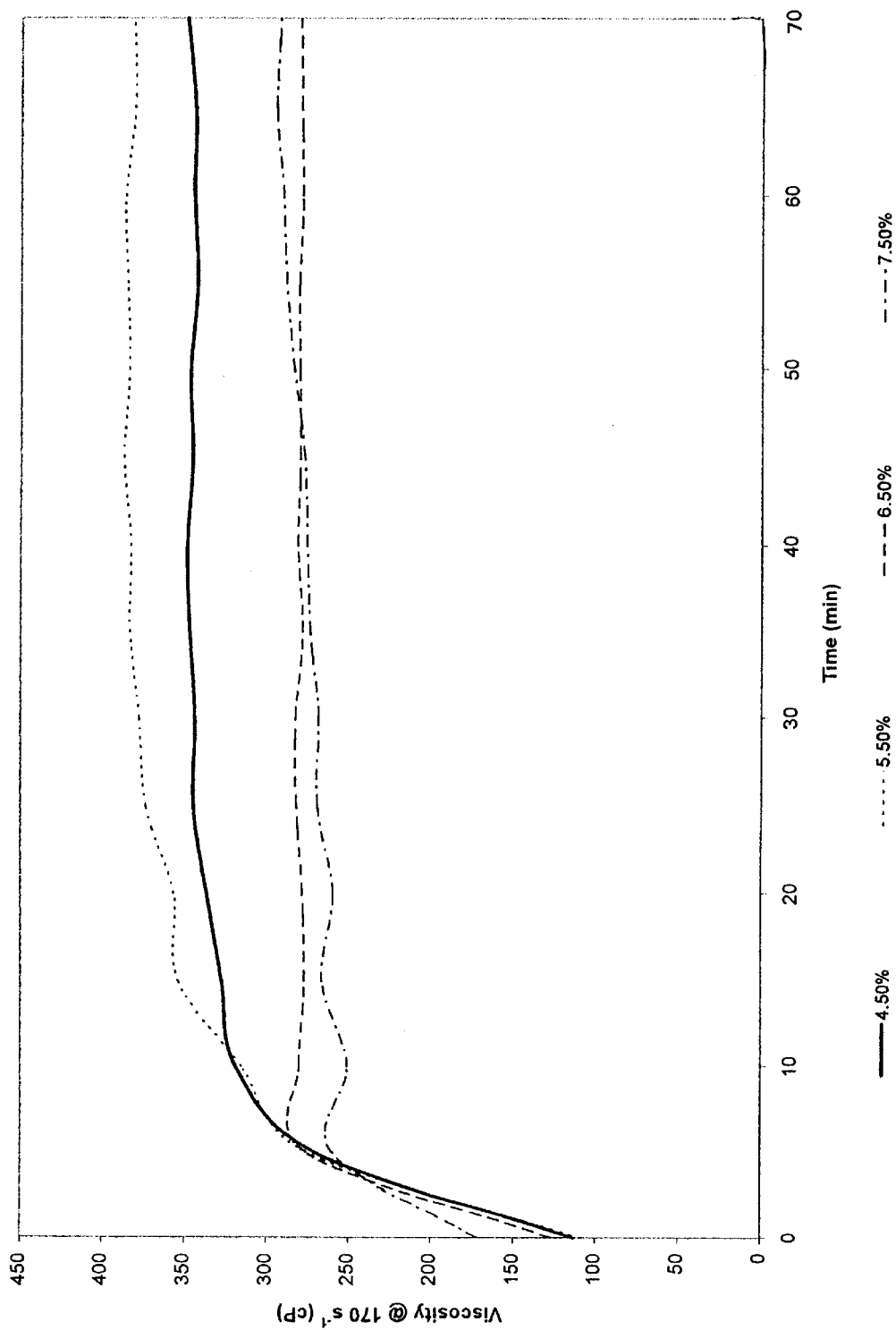
FIG. 2 is a graph illustrating the effect of acid concentration on viscosity in a fluid according to the present invention.

The effects of the present invention is illustrated in FIG. 1. As will be appreciated, the use of sulfuric acid to treat the mixed alkyl phosphate ester base fluid results in about a two-fold viscosity increase. The enhanced viscosity illustrated in FIG. 1 was obtained using sulfuric acid added to obtain a pH of 0.55. This represented a sulfuric acid concentration of 10%. The effect of varying sulfuric acid concentration is illustrated in FIG. 2, from which it can be appreciated that the selection of an appropriate acid concentration will be a matter of choice to one skilled in the art, in view of the teachings of this invention. It will be understood, however, that the acid should be permitted to react with the alkyl phosphate ester for 1–2 hours before activation, to ensure maximum di-ester formation.

Figure 3:
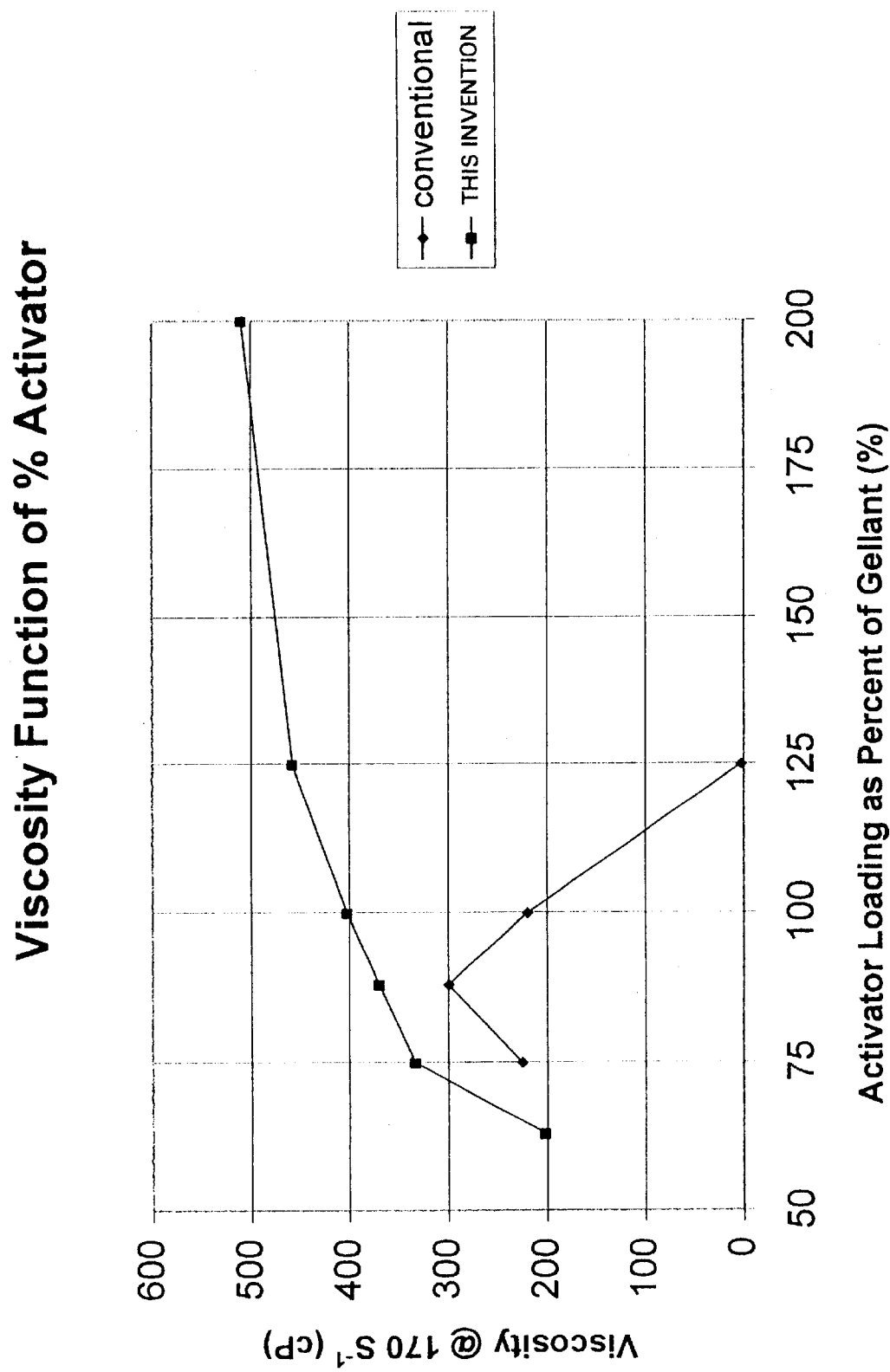
FIG. 3 is a graph illustrating the effect of activator loading on viscosity.

To form a gel in a hydrocarbon solvent according to the present invention, 0.2–1.5% (by weight of hydrocarbon) acidified phosphate alkyl ester is utilized in a refined hydrocarbon, such as diesel fuel or kerosene. As discussed above, acidification levels are a matter of choice. Activator is added in about the same ratio as the gellant (i.e., a ratio of about 1:1, typically). However, a significant advantage of the present invention over the prior systems, is that it is not sensitive to overloading of activator. As illustrated in FIG. 3, the gels of the prior art may easily be over-activated, and at activator levels of only about 5% over ideal, show significant viscosity reduction. At levels of about 125% of gellant, viscosity is typically lost. This is a significant disadvantage of the prior systems, because precision is sometimes difficult to obtain in the field. The system of the present invention, however, is not affected adversely by even 200% loading of activator relative to gellant. About 80% of the maximum gel viscosity is attained, typically, in the first minute of mixing of the acidified ester with the activator. The constituents can and advantageously are, therefore, blended "on the fly" as they are pumped into a formation.

Figure 4:
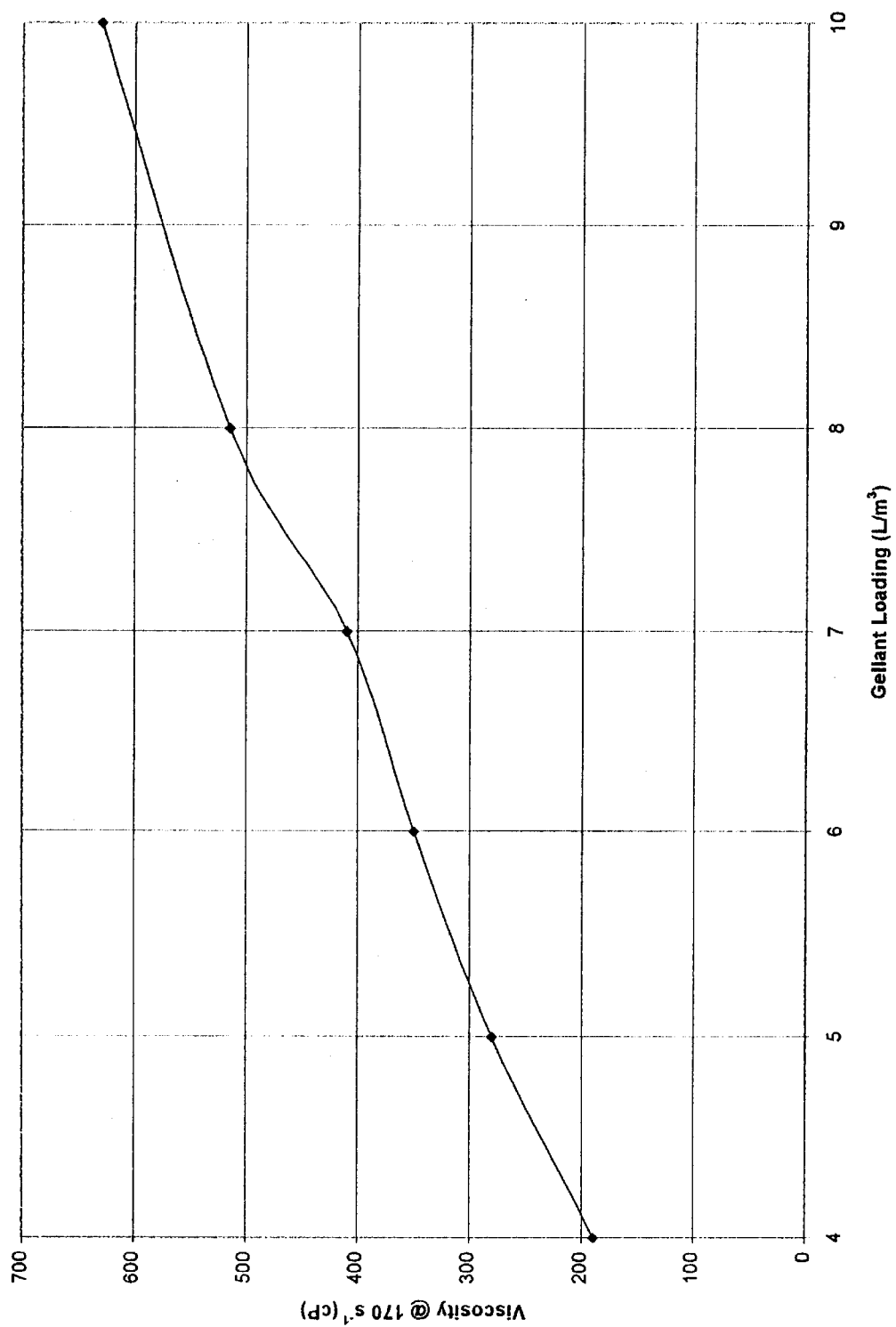
FIG. 4 is a graph illustrating the effect of gellant loading on viscosity formation.

Referring lastly to FIG. 4, the effect of total gellant loading on viscosity is shown. To illustrate that selection of the amount of gellant to be added to a fluid to be gelled will be a matter of choice for one skilled in the art and apprised of the present invention.

The gel may be broken by the use of pH adjusting breakers, such as soda ash, caustic, lime, amines, and acids.

It will be appreciated, therefore, that the present invention provides a reliable viscous gel for use with hydrocarbon solvents, which can be broken on a consistent and effective basis.

The embodiments of the invention in which an exclusive property or privilege is claimed are defined as follows:

1. A fracturing fluid for use in fracturing subterranean formations comprising:
   (a) a hydrocarbon base;
   (b) an acidified mixture of alkyl phosphate esters including mono-alkyl phosphate esters, di-alkyl phosphate esters and tri-alkyl phosphate esters, wherein at least 50% of said alkyl phosphate esters are di-alkyl phosphate esters and less than 5% are tri-alkyl phosphate esters; and
   (c) trivalent metallic cations.

2. A fracturing fluid as claimed in claim 1, wherein at least 65% of said alkyl phosphate esters are di-alkyl phosphate esters.

3. A fracturing fluid as claimed in claim 2, wherein the alkyl component of said alkyl phosphate esters are formed from primary monohydric alkyl alcohols of chain length $C_5$–$C_{16}$.

4. A fracturing fluid as claimed in claim 2, wherein the alkyl component of said alkyl phosphate esters are formed from primary monohydric alkyl alcohols of chain length $C_8$–$C_{12}$.

5. A fracturing fluid as claimed in any preceding claim wherein said alkyl phosphate esters are reacted with a sulfuric acid, to increase the di-alkyl content thereof.

6. A fracturing fluid as claimed in claim 5, wherein said alkyl phosphate esters are acidified to a pH of less than 1.4.

7. A fracturing fluid as claimed in any one of claim 1, 2, 3, 4 or 6, wherein said metal cation is a trivalent ferric ion.

8. A fracturing fluid for use in fracturing subterranean formations comprising:
   (a) a hydrocarbon base;
   (b) an acidified mixture of alkyl phosphate esters including at least 50% of di-alkyl phosphate esters and less than 5% of tri-alkyl phosphate esters; and
   (c) trivalent ferric ions, said fracturing fluid having a pH of 2.0 or less.

* * * * *